US005306141A

United States Patent [19]

Sears

[11] Patent Number: 5,306,141

[45] Date of Patent: Apr. 26, 1994

[54] VETERINARY TOOTH EXTRACTOR

[76] Inventor: Stephen A. Sears, 299-15 Diamond Village, Gainesville, Fla. 32603

[21] Appl. No.: 10,176

[22] Filed: Jan. 28, 1993

[51] Int. Cl.[5] .......................... A61D 5/00; A61C 3/00

[52] U.S. Cl. .......................................... 433/1; 433/154

[58] Field of Search .................. 433/1, 158, 159, 153, 433/154, 161

[56] References Cited

U.S. PATENT DOCUMENTS

| | | | |
|---|---|---|---|
| 509,671 | 11/1893 | McNalley | 433/1 |
| 733,114 | 7/1903 | Anderson | 433/1 |
| 991,772 | 5/1911 | Dunn | 433/1 |
| 1,550,443 | 8/1925 | Maloney | 433/154 |
| 2,430,271 | 11/1947 | Brantley | 433/154 |
| 4,230,454 | 10/1980 | Lococo | 433/153 |
| 5,015,185 | 5/1991 | Cané et al. | 433/153 |

*Primary Examiner*—Gene Mancene
*Assistant Examiner*—Nicholas D. Lucchesi

[57] ABSTRACT

A hand-held and operated instrument suitable for removal of a molar or premolar tooth of an animal, in this particular application, a horse. The device includes the combination of a unique forcep design which articulates via a threaded communication with a drive unit contained within a housing, by which the operator, from outside the mouth, may cause with substantial increase in advantage, the forcep to move in a direction opposite that of the drive housing unit which will then act as a counter-bearing surface upon the teeth or other aspects of the mouth immediately adjacent to the tooth to be extracted. Thus removing or lifting the tooth grasped by the forceps vertically from its socket.

4 Claims, 4 Drawing Sheets

VETERINARY TOOTH EXTRACTOR

BACKGROUND OF THE INVENTION

This invention relates to tooth extractors and more particularly to a novel tooth extractor which is designed to remove an equine cheek tooth from within the animal's mouth. It is not uncommon for the need to remove a horse cheek tooth to arise. Frequently the reason being a profound sinusitis/infection secondary to a diseased tooth. Heretofore, only the most diseased of teeth could be removed from within the mouth utilizing standard veterinary molar extractors, the force being provided solely by the muscular strength of the operator. Due to the inability of horses to "open-wide" the lack of room within the mouth in which to operate has precluded the removal of any molars or premolars that were still tenaciously bound within the socket, by the above described means. The accepted method for removal of cheek teeth in this latter category is the performance of a sinusotomy (in the case of the upper arcade) or the removal of a window of bone around the tooth root (in the case of the lower arcade) and subsequent repulsion of the tooth using a mailet driven punch applied to the root end of the tooth and driving the tooth out of its socket into the mouth. Thus prior to my invention there has been no efficient means by which to extract moderately diseased or nearly normal cheek teeth without great stress being applied to the animal in the performance of a tooth repulsion as described above.

SUMMARY

Accordingly, it is an object of the present invention to provide a tooth extracting instrument specifically suited for extracting a molar or premolar tooth from a horse, or other animal, wherein the instrument is relatively easy to manipulate and maneuver with the hands of the operator outside the mouth of the horse.

Another object of this invention is to provide a tooth extracting instrument in which uniquely designed molar forceps may grasp a tooth and by the action of two sets of articulating screw drives, or some other appropriate gear configuration, remove the tooth and root completely from its socket. The housing in which the two drive mechanisms are contained functions as a counter-bearing surface with adjacent molar or premolar teeth or other aspects of the mouth where it may find purchase.

In accordance with the present invention in a preferred embodiment shown there is provided a pair of molar forceps uniquely designed to accommodate the equine cheek tooth while grasping said tooth and maintaining a low tolerance articulation with vertically oriented stationary screws which turn upon their axes outboard of the forcep heads. They in turn are driven by horizontally positioned worm screws that rotate upon their axes and are turned by the operator from outside the mouth. The vertical screws and horizontal worm screws are connected via a "wormgear". The ability of the operator to turn the screw drives independently of each other allows for small unequal changes in elevation on the medial and lateral aspects of the tooth in relation to its socket. This "rocking" motion coupled with the axial twist the operator can produce by grasping and manipulating the handles of the forceps directly along with the tremendous mechanical advantage produced by the twin screw drive configuration allows the grasped tooth to be removed from its socket. Other objects, advantages, and features of the present invention will become more apparent as the description proceeds taken in conjunction with the accompanying drawings in which:

Figure 1:
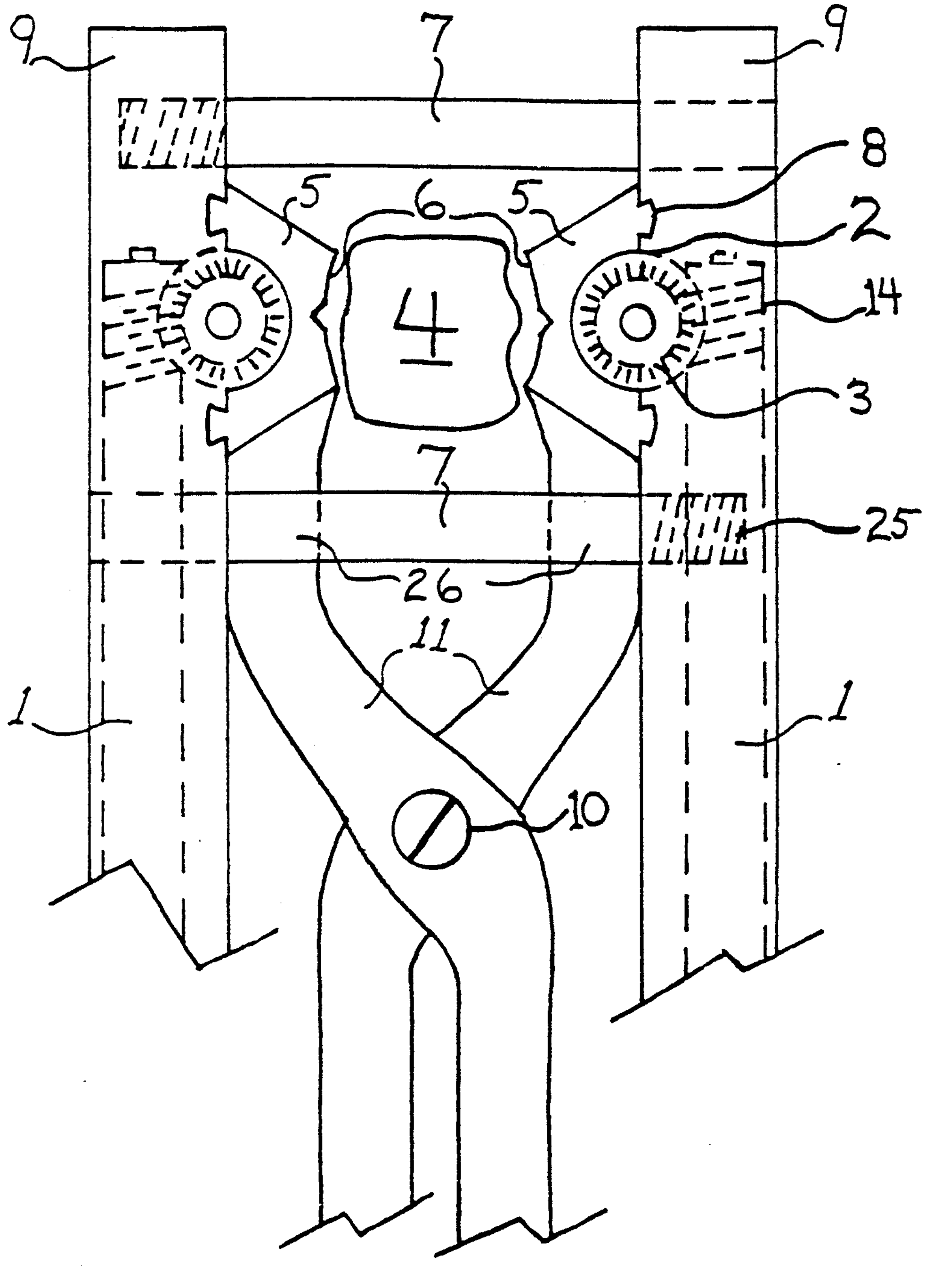
FIG. 1 is a top plan view of the tooth extractor without forcep or driveshaft handles illustrated.
Figure 2:
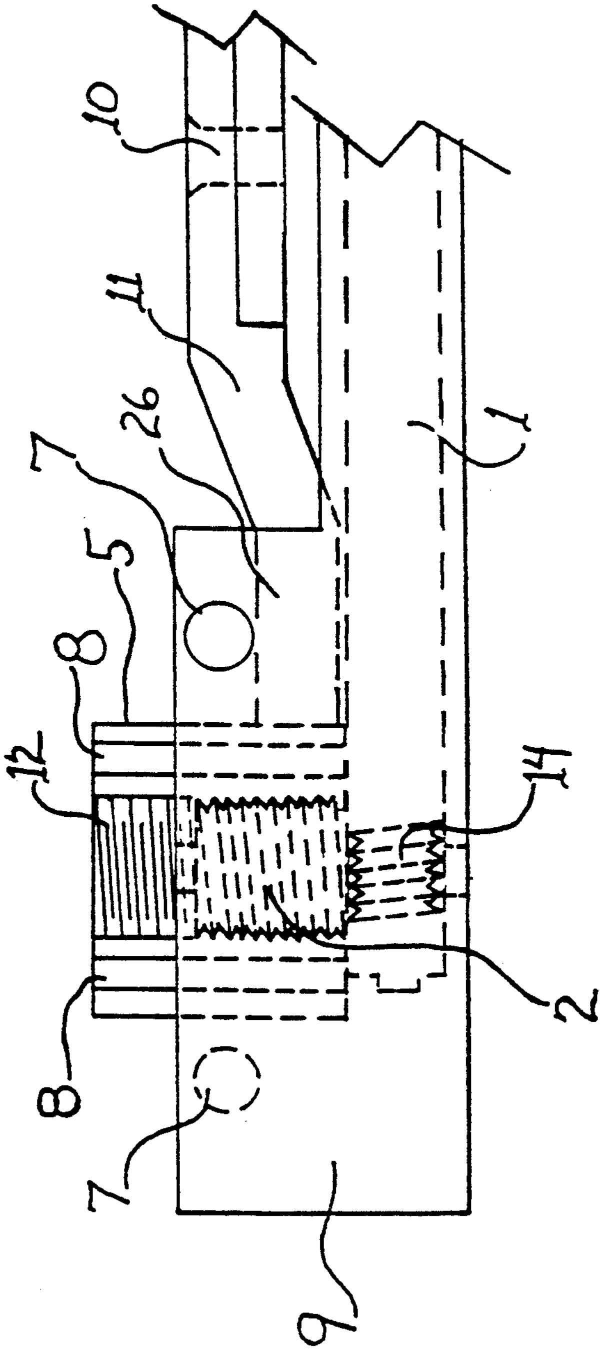
FIG. 2 is a side elevation of the extractor in which the forcep heads are elevated above the housing assembly as they would be for placement upon a tooth.
Figure 3:
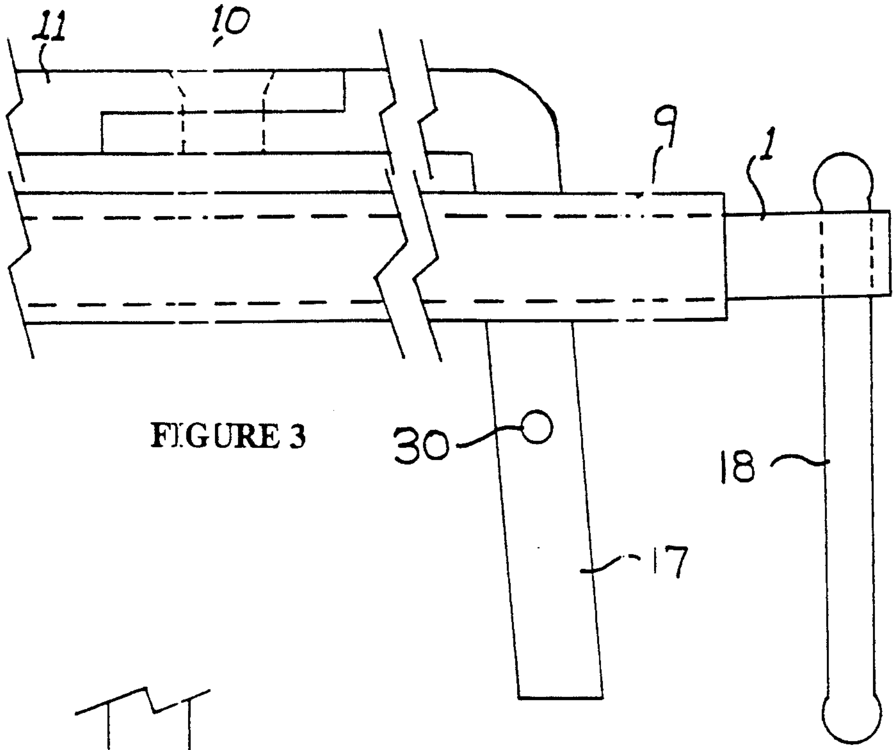
FIG. 3 is a side elevation of the forcep shank handles and drive rod handles.

Referring now to the drawings, in FIGS. 1-6 there is shown a tooth extracting device in which the horizontally positioned drive rods 1 turn upon their axes in place with the threaded worm portion 14 articulating with the vertically oriented threads of the worm gear 3 on the bottom portion of the vertical drive rods 2 which have external threads and rotate about a fixed portion of the housing 9. The threaded upper portion of the vertically positioned drive rod 2 articulates directly with the extractor forcep heads 5. The forceps maintain their position relative to the housing assembly 9 via engagement fittings 8, shown to be dovetail in design, which allow the forceps and housing assembly to slide in the vertical plane relative to each other. The housing assembly crossbars 7 serve as the counter-bearing surfaces adjacent to the grasped molar. Each crossbar 7, of which there are illustrated two, is characterized by one end possessing external threads 25, and the opposite end being smooth. The threaded recesses of the housing in which the threaded rod ends 25, reside, do not pass completely through the housing component 9, and the rods are thus preferably firmly seated into their respective housing member on that side. Conversely, at the end of each rod opposite the threaded end, the rod is smooth and resides within a hole which communicates completely through the housing component 9. The tolerances in the vertical plane, between that portion of each rod that slides relative to a housing member, are necessarily, precisely small, so as to prevent changes in angle between the housing components 9, and the forcep dovetail articulations 8, thus preventing binding from occurring once a load is applied. Alternately, the tolerances between crossbar rod 7, and housing component 9, in the horizontal plane, are, where required, sufficiently large to accommodate the changes in angle from parallel between the housing members 9, that will occur as the forcep heads 5, and thus the housings 9, are opened and closed for placement upon a tooth. The diameters of the rods are of sufficient magnitude, based upon rod composition, to prevent any bending or twist once a load is applied. A concave indentation 6 in the face of the forcep heads 5 increases the surface contact area with the grasped tooth by accommodating the basic conformation of the equine cheek tooth. The truncated pyramidal shape of the forcep heads 5 allows for full 180 degree contact between the female threads of the forcep heads 5 and the male threads of the upper portion of the drive rods 2 while maintaining a narrow enough tooth bearing surface so as to avoid overlapping adjacent teeth when engaged upon the tooth 4 to be extracted. The forceps, housing assembly and drive gears are constructed of a metal sufficiently hard enough to maintain the desired tolerances under strain, through repeated uses over long periods of time. The lateral position of the drive units allows that only the pivot region 10 of the forceps and the crossbars 7 need cross the space between the table surfaces of the upper and lower molar arcades, that space being generally about one inch in height. This design takes particular advantage of the general conformation of the equine mouth.

Figure 4:
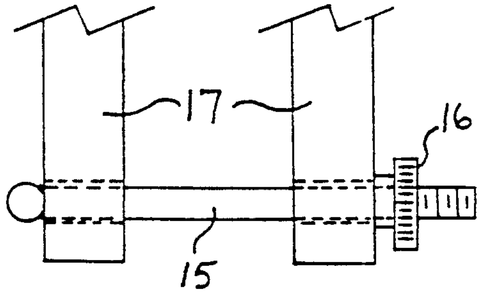
FIG. 4 is a top plan view of the tension maintaining device.
Figure 6:
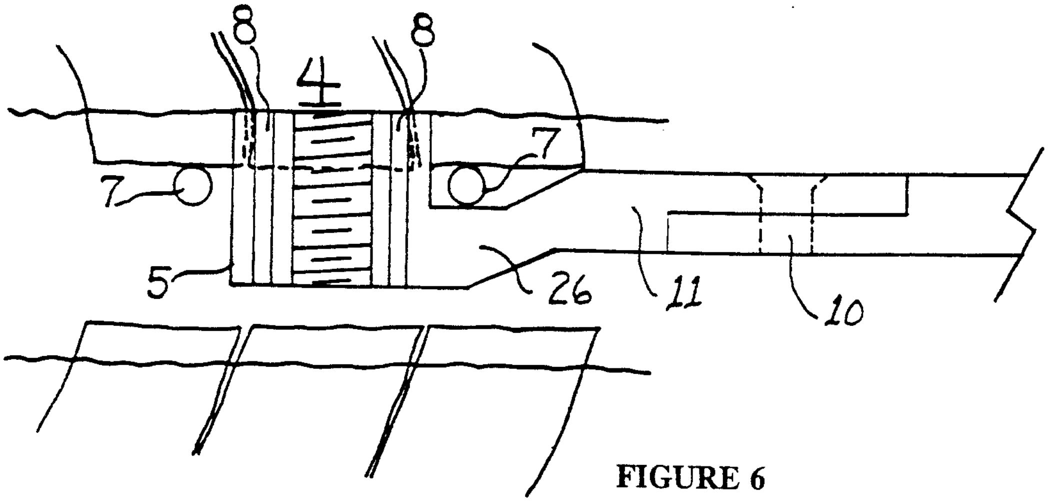
FIG. 6 is a side elevation cutaway view of a forcep unit and crossbar assembly relative to the upper and lower molar arcades as in place for operation.

The external dovetails 8 sliding within the internal dovetail grooves of the housing assembly maintain the forceps in close opposition with the drive units rods 2 as the forceps move up and down. The crossbars 7 abutt the rostral and caudal adjacent teeth or other aspects of the mouth to act as the counter-bearing surface which provides the purchase required to lift/pull the grasped tooth vertically from its socket. The forcep heads 5 are placed upon the lateral and medial exposed aspects of the tooth to be removed while tension through the forcep shanks 11 is maintained by the operator grasping together the forcep handles 17 as pictured in FIG. 3. The tension maintaining device 15 in FIG. 4 is then set to allow the operator to let go of the entire assembly which will then be suspended from the tooth of interest. The operator may then turn independently of one another the drive rods 1 in a sequence most conducive to disruption of the periodontal ligamentous attachment between the tooth root and its socket. As the drive rods 1 rotate, their worm threads 14 transfer their force to the vertical plane by articulation with the worm gear 3 (which is not visible behind the threaded portion of drive rod 1 in FIG. 2) on the lower portion of the vertical drive rod 2. This causes the vertical drive rod 2 to turn upon its axis in place with its horizontal external threads articulating with the internal threads 12 of the forcep heads 5 in FIG. 2. This forces the drive and housing assembly 9 upward until the crossbars 7 make contact with adjacent teeth or other aspects of the mouth. At this point the drive rods 1 and forcep handles 17 are manipulated by the operator until the tooth's attachment to its socket is overcome. In this manner a portion 26 of the tooth grasping means moves away from the crossbars 7 which rest against the table surfaces of teeth adjacent to the tooth which is being extracted as shown in FIG. 6. Thus depending on the length of the tooth root, the tooth may be removed with the extractor pictured or said extractor removed and the tooth extracted with conventional forceps if not by hand.

Figure 5:
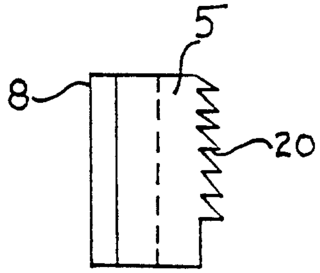
FIG. 5 is a front end elevation of a forcep head unit.

The forcep shanks are controlled by the operator by grasping the handles 17 which have a bend of approximately 80 degrees in order to make it easier for the operator to handle the placement of the forcep heads 5 upon the tooth to be extracted. This bend allows the operator's hand to remain below the mouth thus enhancing the operator's ability to see within the mouth. Once the forcep heads 5 are placed upon the tooth the handles 17 are closed together as tight as necessary to ensure an adequate seating of the forcep teeth 20 as shown in FIG. 5 into the tooth. At that point a lock nut 16, or the like, is tightened down upon the threaded rod 15 which acts to maintain the tension in the forcep shanks and thus upon the tooth through the forcep heads 5. The holes 30 in the forcep handles 17 are of a diameter large enough to allow for changes in angle from parallel between the two shanks as they are brought closer together or moved farther apart and prevent binding of the rod 15. After the forceps are set in place the operator may then turn the drive rods 1 by grasping the handles 18 and turning. The handles 18 slide within the drive rod 1 which allows the handles to be of sufficient length to fit comfortably in the operator's hand and also provide mechanical advantage while avoiding contact or interference with the opposite handle which is necessarily in close proximity due to the narrowness of the mouth and thus the narrowness of the device itself. The teeth 20 of the forcep head 5 as shown in FIG. 5 are of a dimension substantial enough and sharp enough to bite adequately into the surface of the tooth sufficiently to prevent slippage once a lifting force is applied.

It is recognized that other combinations of screws, helical gears, or the like could be utilized to provide the force necessary to actuate the device and that the prior explanation and accompanying drawings are but one representation of a basic idea whereby there is a 90 degree transfer of force applied outboard of the forcep heads and thus not between the occlusal surfaces of the opposing molar arcades, the intent of which is to remove a tooth from within an animal's mouth.

I claim:

1. A tooth extracting assembly having a tooth grasping means, a purchase means, means to displace a portion of said tooth grasping means away from said purchase means while extracting said tooth, and means to cause said tooth grasping means to grasp said tooth, said means to cause being located substantially entirely beyond the area between occlusal surfaces of molar arcades within a patient's mouth when said assembly is mounted therein.

2. A tooth extracting assembly according to claim 1 wherein said means to displace includes a gear mechanism.

3. A tooth extracting assembly having a tooth grasping means, a purchase means and means to displace a portion of said tooth grasping means away from said purchase means while extracting said tooth, wherein said means to displace includes a gear mechanism.

4. A method of extracting a tooth comprising a first step of grasping a medial and lateral surface of the tooth with a grasping means comprising means to cause said tooth grasping means to grasp said tooth, said means to cause being located substantially entirely beyond the area between occlusal surfaces of molar arcades within a patient's mouth a second step of actuating a displacement means to displace a purchase means to a surface adjacent to the grasped tooth wherein a portion of the grasping means is displaced away from said purchase means, thus extracting the tooth.

* * * * *